Patented June 28, 1949

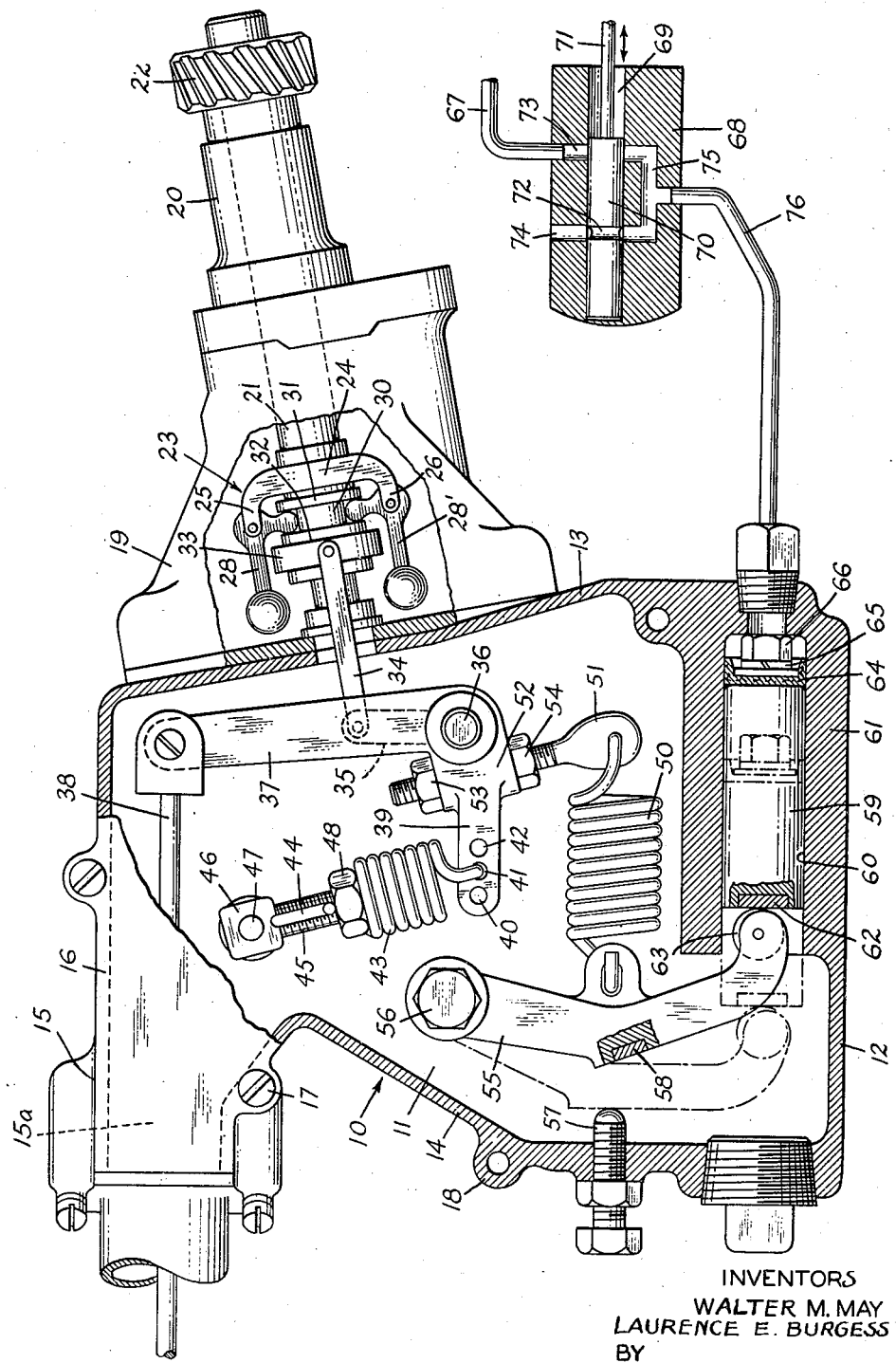

2,474,316

UNITED STATES PATENT OFFICE 2,474,316

TWO-SPEED GOVERNOR

Walter M. May, Plainfield, N. J., and Laurence E. Burgess, Allentown, Pa., assignors to Mack Manufacturing Corporation, New York, N. Y., a corporation of Delaware Application May 7, 1948, Serial No. 25,684

6 Claims. (Cl. 74—472)

This invention relates to improvements in speed responsive devices and it relates particularly to an improved form of engine governor which is particularly suitable for use in buses, trucks and other vehicles to prevent them from being operated at excessive speed and to control the speed of the engine in operating power take-off devices and the like to prolong the life of the engine.

It has been suggested heretofore that the engines of commercial vehicles should be provided with governors for limiting their speed to prevent violation of speed regulations, to comply with some state laws, to obtain better operating economy and for many other reasons. The prior speed governors are satisfactory for limiting the top speed of a vehicle, but they leave something to be desired in the overall operation of the vehicle. If the engine speed governor is adjusted to limit the maximum speed of the vehicle, then the vehicle performance may suffer in the higher transmission gear ratios because the engine cannot be operated at a sufficiently high speed to provide a maximum power output.

In the ordinary operation of the vehicle, different engine speeds must be provided for in order to provide proper acceleration in different speed ranges or gear ratios of the vehicles. Thus, for example, if the top speed of the vehicle in high gear is to be limited, for example, to a maximum of 45 miles an hour, the governor should permit higher engine speeds when the vehicle is operated, for example, in low gear and high engine speeds are required to deliver the necessary power to enable the truck or other vehicle to climb steep grades.

An object of the present invention, therefore, is to provide a governor construction which permits high speed operation of the engine in the low speed gear ratios of the vehicle while at the same time effectively governing the speed of the engine and the vehicle in the high speed gear ratios.

Another object of the invention is to provide a two-speed governor which permits the engine to operate at a governed high speed in the low speed gear ratios of the vehicle but effectively limits the high speed range of the vehicle in high gear.

Other objects of the invention will become apparent from the following description of a typical form of governor construction embodying the present invention.

In accordance with the present invention, a governor construction is provided for controlling the throttle of the engine so that the governor acts to retard or close the throttle at two different engine speeds corresponding to high gear and low gear operation of the vehicle.

More particularly, the invention includes a throttle control lever which is responsive to the operation of a centrifugal governor driven by the engine and to the action of one or two springs which are effective to resist displacement of the throttle control lever depending upon the gear ratio of the transmission in which the vehicle is operating. Thus, in accordance with the present invention, when the vehicle is in high gear, substantially only one spring is effective to oppose the action of the centrifugal governor so that the throttle control mechanism acts to reduce or to limit the speed of operation of the engine at a predetermined number of revolutions per minute of the engine. When the vehicle is in low gear, operation of the throttle control lever by the centrifugal governor is opposed by two springs which thereby permit the engine to be driven at a higher number of revolutions per minute before the centrifugal governor exerts enough energy to overcome the resistance of the springs and thereby reduce the throttle opening.

Preferably, the selective action of the springs is controlled by the position of the shifter rod of the transmission, which, through the medium of a valve, controls the air pressure exerted on a piston to place one of the springs under tension or relieve the spring of tension. However, other equivalent control mechanisms, such as solenoids and the like, may be used, if desired, for rendering the second spring effective or ineffective depending upon operating requirements.

For a better understanding of the present invention, reference may be had to the accompanying drawing, in which:

The single figure is a view in elevation of a typical form of governor mechanism embodying the present invention shown partly broken away and partly in section to disclose details of construction.

As shown in the drawing, the governor may include a suitable casing 10. As illustrated, the casing 10 may be provided with a flat back wall 11, a straight end wall 12, inclined side walls 13 and 14 and another end wall 15. The side wall 14 and the end wall 15 terminate in laterally projecting portions forming a channel 15a for a purpose to be described. The casing is completed by means of a flat cover plate 16 which is joined to the side walls of the casing by means of suitable screws 17 threaded into bosses 18 around the periphery of the casing.

Mounted on the inclined side wall 13 of the casing is a governor housing 19 which is provided with a tubular extension 20 in which is rotatably mounted the governor shaft 21. A spiral gear 22 is mounted on the governor shaft 21 to couple the shaft to a rotary element of the engine of the vehicle, not shown, so that operation of the engine causes rotation of the governor shaft. Mounted on the inner end of the shaft 21 is a fly-weight governor 23 which may be of any desired type. The form of governor illustrated may include a yoke member 24 which is keyed or otherwise fixed to the shaft 21 and is provided with laterally projecting arms 25, 26, etc. which carry pivotally the L-shaped fly-weight arms 28, 28'. The inner ends of the arms 28, 28' are rockably received in a groove 30 in a collar 31 which is slidably mounted for movement lengthwise of the governor shaft 21. The collar 31 is provided with another groove 32 for receiving rotatably a ring 33 having a link 34 pivotally connected to it. The link 34 is pivotally connected to a lever 35 which projects laterally from a stub shaft 36 rotatably mounted in the back wall 11 of the casing. The shaft 36 carries a second lever 37 which is connected to a throttle control rod 38 which extends up to the throttle valve of the engine through the channel 15a and is so arranged that upon counter-clockwise rotation of the shaft 36, the throttle valve is moved toward closed position to retard or slow down the engine. The throttle valve preferably operates independently of the foot controlled throttle valve so that the governor-controlled throttle valve can reduce the engine speed even though the foot-controlled throttle valve is fully opened.

With the construction described above, the throttle control rod 38 would normally be directly responsive to rotation of the governor 23 and thus, if any attempt were made to speed up the engine, the governor would act to oppose such operation and thus the engine and the vehicle could not be accelerated. In order to allow a predetermined engine speed to be reached, the shaft 36 is provided with a third lever 39 which is provided with a series of holes 40, 41 and 42 spaced along its length for receiving the end of a coiled tension spring 43. By shifting the end of the spring 43 from one hole to another, the leverage is changed, which, in turn, changes the sensitivity or response of the governor. The opposite end of this spring extends into a slot 44 in a tubular sleeve 45, the upper end of which is provided with a lug 46. The lug 46 is supported on a pivot pin 47 projecting upwardly from the back wall 11 of the casing. A nut member 48 is threaded on the sleeve 45 and receives the hooked end of the spring 43, so that upon rotation of the nut, the spring may be stretched or allowed to contract to place the proper tension on it for opposing the action of the governor. Thus, by adjusting the tension on the spring and by connecting the lower end of the spring to the lever 39 through one of the holes 40, 41 or 42, a predetermined speed of rotation of the governor 23 must be attained before the throttle control rod 38 is moved to prevent further increase in engine speed.

Only the spring 43 is in use when the vehicle is in high gear so that the maximum speed of the vehicle is controlled by the action of the spring 43 and the governor 23.

Inasmuch as higher engine speed may be required in the lower gear ratios, a second spring 50 is provided for resisting the operation of the governor and thus allowing a higher engine speed to be attained in the low gear ratios. The spring 50 is connected at one end to a threaded stud 51 which is threaded through a boss 52 on the lever 39. By varying the projecting length of the stud 51, it is possible to adjust the effect of the spring 50 on the throttle control lever 37. When the stud 51 is adjusted, it may be locked in position by suitable lock nuts 53 and 54.

The opposite end of the spring 50 is connected to a lever 55 which is supported for pivotal movement on a screw 56 threaded into the back wall 11 of the casing. Clockwise movement of the lever 55 is limited by means of a set screw 57 threaded through the side wall 14 of the casing. The screw 57 may be adjusted to vary the tension of the spring 50. The end of the screw 57 engages a hardened insert 58 in the back of the lever 55 when the spring 50 is tensioned to a predetermined value. The lever 55 is normally urged to the right or counter-clockwise by the spring 50 so that the spring is unstressed or only slightly stressed. Movement of the lever 55 between the stressed and unstressed positions of the spring 50 is controlled by means of a piston 59 which is slidably mounted in a cylinder 60 formed in a thickened portion 61 of the casing 10. The piston 59 may be of a rod-like form having a hardened steel insert 62 at its left-hand end cooperating with a roller 63 carried by the lower end of the lever 55. The opposite end of the piston 59 may be provided with a packing or leather 64 which is clamped in position by means of a washer 65 and the head of a machine screw 66. The piston is normally urged to the right, by the action of the spring 50, into a retracted position.

Movement of the piston to the left to tension the spring 50 may be produced by means of air pressure supplied from the air brake system of the vehicle or from an auxiliary compressor or the like. Air is supplied through the conduit 67 to a slide valve 68 having a cylinder 69 in which is mounted a cylindrical valve plug 70. The valve plug is connected by means of a shaft or rod 71 to the shifter rail or rod of the vehicle transmission so that the valve plug 70 moves in response to shifting of the gears of the vehicle. The piston 70 is provided with a peripheral groove 72 for communication either with the port 73 which is connected to the air pressure line 67 or the exhaust port 74 which opens to atmosphere. Also, the groove 72 communicates, in both of these positions, with a passage 75 having spaced apart end branches and a central branch connected by means of a conduit 76 to the cylinder 60. Thus, when the valve plug 70 is in the position shown, air in the cylinder 60 is vented through the passage 75, the groove 72 and the port 74 to atmosphere. This position of the valve corresponds to the high gear position of the shifter rail.

When the valve plug is shifted to the right to a position corresponding to low or intermediate gear position of the shifter rail, the groove 72 in the plug aligns with the port 73 and the right-hand branch of the passage 75 so that air is supplied to the cylinder 60 and the piston 59 is projected to the left. In this position of the piston, the lever 55 is forced against the set screw 57 and the spring 50 is placed under tension so that both of the springs 43 and 50 resist counter-clockwise movement of the throttle control lever 37 in response to operation of the governor 23. Inasmuch as movement of the throttle control lever 37 is opposed more strongly under these conditions, a higher engine speed can be attained before the opposition of the springs is overcome. As a consequence, a higher engine speed may be attained in the low gear ratios than the engine speed attained in the high gear ratio, but overspeeding of the vehicle and overspeeding of the engine under different gear ratio conditions can be prevented.

It will be understood that the mechanism described above is susceptible to considerable modification in its shape and dimensions and that different types of governors and equivalent types of devices for tensioning the spring 50, such as

We claim:

1. In a variable engine speed governor for a vehicle having a change speed transmission shiftable between higher and lower gear ranges; the combination of throttle control means, a centrifugal governor adapted to be connected to and driven by the engine, means for connecting said governor to said throttle control means and tending to move the latter to limit the engine speed, first means opposing the movement of said throttle control means to restrict said engine speed to a predetermined speed in said higher gear ranges, and second means connected to said transmission and responsive to shifting of the transmission into said lower gear ranges to increase the opposition to the movement of the throttle control means in the lower gear range to allow the engine speed to exceed said predetermined maximum.

2. In a variable engine speed governor for a vehicle having a change speed transmission shiftable between higher and lower gear ranges; the combination of throttle control means for said engine, a centrifugal governor adapted to be driven by said engine, means connecting said governor to said throttle control means and tending to move the latter to reduce engine speed as the engine speed increases, first resilient means opposing movement of said throttle control means to allow a predetermined engine speed to be attained, second resilient means connected to said throttle control means, and means responsive to shifting of the transmission between higher and lower gear ranges for varying the tension of said second resilient means to oppose movement of the throttle control member more strongly in the lower gear range than in the higher gear range.

3. In a variable engine speed governor for a vehicle having a change speed transmission, and means movable to shift said transmission between higher and lower gear ranges; the combination of throttle control means for said engine, a centrifugal governor adapted to be driven by said engine, means connecting said throttle control means to said governor for moving said throttle control means in response to change in engine speed, a first spring connected to said throttle control means for opposing movement of the latter until a predetermined engine speed is attained, a second spring having one end connected to said throttle control means, and means connected to the other end of said second spring and responsive to movement of said shifting means for tensioning said second spring more strongly in the lower gear range than in the higher gear range.

4. In a variable speed governor for a vehicle having a change speed transmission, and means movable to shift said transmission between higher and lower gear ranges; the combination of throttle control means for said engine, a centrifugal governor adapted to be driven by said engine, means connecting said throttle control means to said governor for moving said throttle control means in response to change in engine speed, a first spring connected to said throttle control means for opposing movement of the latter until a predetermined engine speed is attained, a second spring having one end connected to said throttle control means, a shiftable member connected to the other end of said second spring for increasing and decreasing the tension on said spring for opposing movement of said throttle control member, and means connected to said transmission shifting means for shifting said shiftable member to tension said second spring more strongly in the lower gear range than in the higher gear range.

5. In a variable engine speed governor for a vehicle having a change speed transmission, and means movable to shift said transmission between higher and lower gear ranges; the combination of throttle control means for said engine, a centrifugal governor adapted to be driven by said engine, means connecting said throttle control means to said governor for moving said throttle control means in response to change in engine speed, a first spring connected to said throttle control means for opposing movement of the latter until a predetermined engine speed is attained, a second spring having one end connected to said throttle control means, a lever connected to the other end of said second spring, a reciprocable plunger member engageable with said lever to displace it and stress said spring, and means responsive to movement of said shifting means, for displacing said plunger member to tension said spring more strongly in the lower gear range than in the higher gear range.

6. In a variable engine speed governor for a vehicle having a change speed transmission, and means movable to shift said transmission between higher and lower gear ranges; the combination of throttle control means for said engine, a centrifugal governor adapted to be driven by said engine, means connecting said throttle control means to said governor for moving said throttle control means in response to change in engine speed, a first spring connected to said throttle control means for opposing movement of the latter until a predetermined engine speed is attained, a second spring having one end connected to said throttle control means, a cylinder, a piston movable in said cylinder, means connecting said second spring to said piston for tensioning said second spring and substantially relieving it of tension in response to movement of said piston, means for supplying fluid under pressure to said cylinder, and a valve member responsive to said shifting means for connecting said fluid supplying means to said cylinder in the lower gear range to tension said spring, and for venting said cylinder to relieve said tension in the higher gear range.

WALTER M. MAY.
LAURENCE E. BURGESS.

REFERENCES CITED

The following references are of record in the file of this patent:

UNITED STATES PATENTS

| Number | Name | Date |
| --- | --- | --- |
| 2,177,909 | Sechrist | Oct. 31, 1939 |
| 2,227,174 | Baster | Dec. 31, 1940 |
| 2,421,496 | Grieshaber et al. | June 3, 1947 |
| 2,443,084 | Rhodes | June 8, 1948 |